(12) United States Patent
Tsukamoto et al.

(10) Patent No.: US 6,424,391 B1
(45) Date of Patent: Jul. 23, 2002

(54) FLAT-PANEL DISPLAY DEVICE

(75) Inventors: Takayoshi Tsukamoto; Mitsutake Ikeda; Shin Kawachi, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 195 days.

(21) Appl. No.: 09/606,083

(22) Filed: Jun. 29, 2000

(30) Foreign Application Priority Data

Jun. 29, 1999 (JP) .......................................... 11-184344

(51) Int. Cl.[7] .............................................. G02F 1/1333
(52) U.S. Cl. ........................................ 349/58; 361/681
(58) Field of Search ............................ 349/58; 361/681, 361/683, 684, 685; 345/156; 348/794, 836

(56) References Cited

U.S. PATENT DOCUMENTS

| | | | |
|---|---|---|---|
| 5,835,139 A | 11/1998 | Yun et al. | 349/58 |
| 5,872,606 A | 2/1999 | Kim | 349/58 |
| 5,926,237 A | 7/1999 | Yun et al. | 349/58 |

*Primary Examiner*—William L. Sikes
*Assistant Examiner*—Hoan Nguyen
(74) *Attorney, Agent, or Firm*—Pillsbury Winthrop LLP

(57) ABSTRACT

A flat-panel display device is provided, that does not allow deformation due to fastening forces of a male screw even despite a gap which is created by a dimensional tolerance or the like between a bezel disposed to a display cell and a housing. Female screws 26 formed in a bezel 22 are deformable in a direction toward an inner surface of the housing 25. The fastening force of male screws 27, which penetrates a side wall portion 25a of the housing 25 in which the display cell 11 is housed and a side-surface portion 24 of the bezel 22 and which engages with the female screws 26 formed in the bezel 22, does not cause large deformation.

8 Claims, 7 Drawing Sheets

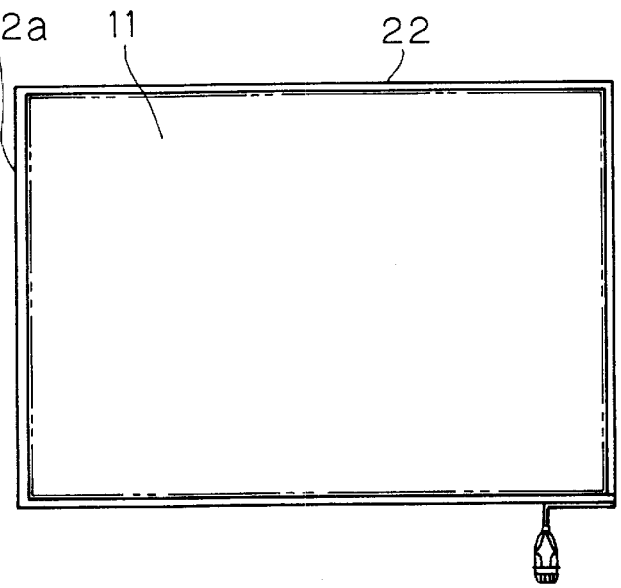
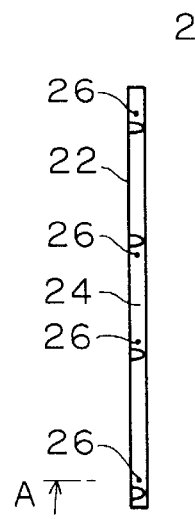
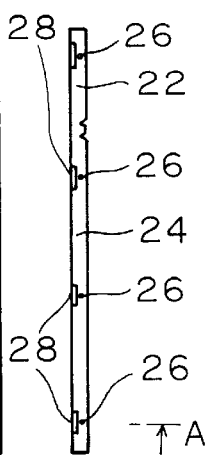
FIG.1A    FIG.1B    FIG.1C
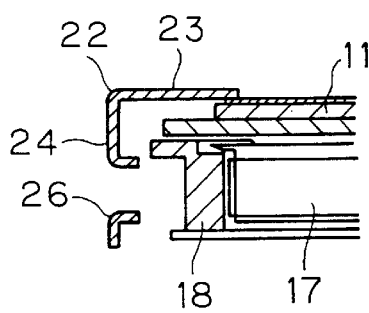  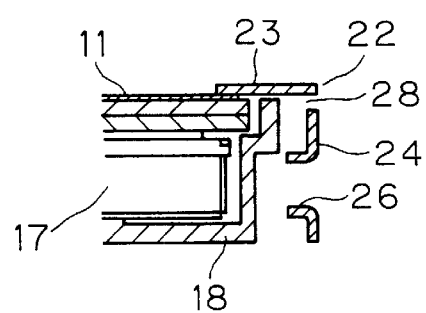
FIG.2

FLAT-PANEL DISPLAY DEVICE

FIELD OF THE INVENTION

The present invention relates to a flat-panel display device in which a flat-shaped display cell is fixedly housed in a housing by means of a bezel.

RELATED ART OF THE INVENTION

In general, when assembling a flat-panel display device which comprises a flat-shaped display cell such as a liquid crystal display cell, as shown in FIGS. 16 and 17, a so-called side fixing method is utilized for fastening elements together which requires housing a flat-shaped display cell 11 in a housing not shown with a display surface of the display cell open and to screw-fit a male screw 14 into a bezel 12 through an attaching member 13 which is disposed to a side wall portion of the housing.

The bezel 12 is formed by a metallic material into the shape of a picture frame, and as shown in FIG. 17, has a front-surface portion 15 and a side-surface portion 16 which approximately define the letter "L" in cross section. The front-surface portion 15 and the side-surface portion 16 cover the periphery of a front surface and side surfaces of the display cell 11, whereby the display cell 11 is fixed to the housing. Denoted at 17 is a backlight which is held by a frame 18 which is made of plastic or the like and disposed to a back surface of the display cell 11. The bezel 12 is fixedly fitted to the frame 18.

In such a flat-panel display device, in the case where there is a gap created between the side-surface portion 16 of the bezel 12 and the attaching member 13 disposed to the housing due to an outside dimensional tolerance of the display cell 11 or an outside dimensional tolerance of the housing, etc., as the male screw 14 is inserted through the attaching member 13 of the housing into engagement with a female screw 19 which is formed in the side-surface portion 16 of the bezel 12 and these elements are fastened together, the fastening force may deform the bezel 12 or the attaching member 13 disposed to the housing and may deviate the center of the housing from the center of the display screen 15.

FIGS. 16 and 17 show a state in which the fastening force pulls one side of the bezel 12 toward the attaching member 13 of the housing, thereby causing bending of the side of the bezel 12.

If the side of the bezel 12 bends in this manner, a display window of the bezel 12 also bends, inviting an inconvenience in that the display window of the housing and the display screen of the display cell 11 are not positionally aligned to each other. Further, with the side of the bezel 12 bent in this manner, downward force acts upon an inner side 15a of the front-surface portion 15 of the bezel 12 and strongly pressurizes a surface of the display cell 11. This may cause pooling due to vibration or disconnection of a tab due to a torsional load during use of the flat-panel display device.

On the other hand the fastening force of the male screw 14 deforms the housing in some cases, and since this is distortion created at an unspecified position, positional accuracy between the display cell 11 and the housing decreases, which may induce interference between the display screen of the display cell 11 and a front mask of the housing, etc.

A gap created between the bezel 12 fitted at the display cell 11 side and the housing due to a dimensional tolerance or the like leads to a problem in that the fastening force of the male screw 14 which fixes a space between the bezel 12 of the display cell 11 side and the housing creates distortion and various types of inconvenience.

BRIEF SUMMARY OF THE INVENTION

The present invention has been made to solve the problems above. Accordingly, an object of the present invention is to provide a flat-panel display device in which distortion due to the fastening force of a male screw is not created even when a dimensional tolerance or the like creates a gap between a bezel which is fitted with a display cell and a housing.

A first aspect of the present invention is directed to a flat-panel display device comprising a display cell which has a flat shape and includes a display screen in a surface, and a bezel for fixing which includes a front-surface portion having an opening portion and shaped like a picture frame and a side-surface portion disposed at sides of said front-surface portion, said bezel covering the periphery of a front surface and side surfaces of said display cell, said flat-panel display device allowing housing of said display cell, covered with said bezel, into a housing with said surface open, wherein a portion of said side-surface portion of said bezel is deformably formed, a female screw is formed in the deformable portion, and said housing is fixedly screwed to said side-surface portion of said bezel which comprises said female screw.

According to a second aspect of the present invention, in the flat-panel display device of the first aspect of the present invention, a slit is formed in said side-surface portion so that a portion of said side-surface portion is deformable.

According to a third aspect of the present invention, in the flat-panel display device of the first aspect of the present invention, a slit is formed above said female screw so that a portion of said side-surface portion is deformable.

According to a fourth aspect of the present invention, in the flat-panel display device of the first aspect of the present invention, slits are formed above and below said female screw so that a portion of said side-surface portion is deformable.

According to a fifth aspect of the present invention, in the flat-panel display device of the first aspect of the present invention, slits are formed on the right-hand side and the left-hand side of said female screw so that a portion of said side-surface portion is deformable.

According to a sixth aspect of the present invention, in the flat-panel display device of the first to the fifth aspects of the present invention, an angle between said front-surface portion of said bezel and said side-surface portion of said bezel is larger than 90 degrees.

A seventh aspect of the present invention is directed to a flat-panel display device, comprising: a display cell which has a flat shape and includes a display screen on the surface; a backlight which is arranged on a back surface of said display cell; a flexible frame which holds said display cell and said backlight as one unit; and a bezel for fixing which includes a front-surface portion having an opening portion and shaped like a picture frame, and a side-surface portion disposed at sides of said front-surface portion, said bezel covering the periphery of a front surface of said display cell and a side-surface portion of said frame, said flat-panel display device allowing housing of said display cell, covered with said bezel, into a housing with said surface open, wherein an opening is formed in side-surface portion of said bezel, a portion of said side-surface portion of said frame is distortionably formed, a female screw is formed in said deformable portion of said side-surface portion of said frame, and a screw is engaged in said female screw from said housing through said opening of side-surface portion of said bezel.

According to an eighth aspect of the present invention, in the flat-panel display device of the seventh aspect of the present invention, said side-surface portion of said frame is formed thin so that a portion of said side-surface portion is deformable.

According to the present invention, the display cell does not become greatly deformed, which avoids various types of inconveniences induced by distortions.

BRIEF DESCRIPTION OF THE DRAWINGS

FIG. 1A, 1B and 1C show the first preferred embodiment of a flat-panel display device according to the present invention, among which FIG. 1A is a plan view, FIG. 1B is a left-hand side view, and FIG. 1C is a right-hand side view;

FIG. 2 is a cross sectional view of FIG. 1 taken along A—A;

DETAILED DESCRIPTION OF THE INVENTION

In the following, the first preferred embodiment of the present invention will be described with reference to FIGS. 1 through 4.

Figure 16:
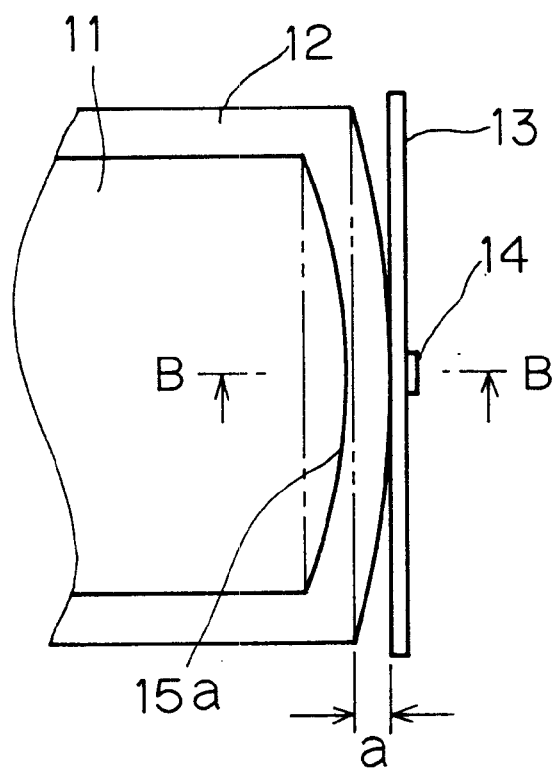
FIG. 16 is a plan view for describing a problem with a conventional technique.
Figure 17:
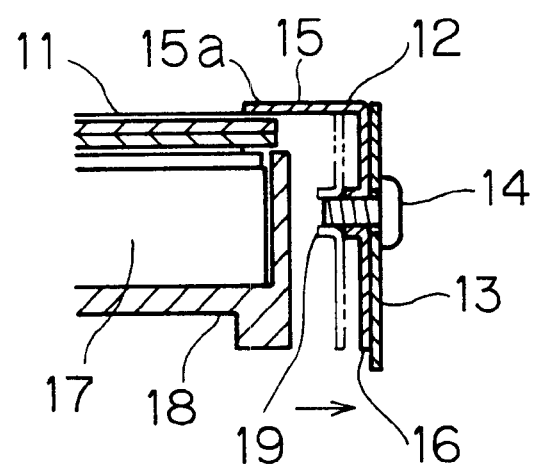
FIG. 17 is a cross sectional view of FIG. 16 taken along B—B.

Portions which correspond to portions according to the conventional technique shown in FIGS. 16 and 17 will be denoted by identical reference symbols.

As shown in FIGS. 1 through 4, a flat-shaped display cell 11, such as a liquid crystal display cell, and a backlight are housed in a frame, and the frame is housed in a bezel 22 which is formed by a metallic material into the shape of a picture frame. The frame is engaged with the bezel 22, whereby these two elements are fixed to each other. The two elements may be screwed to each other.

Figure 3:
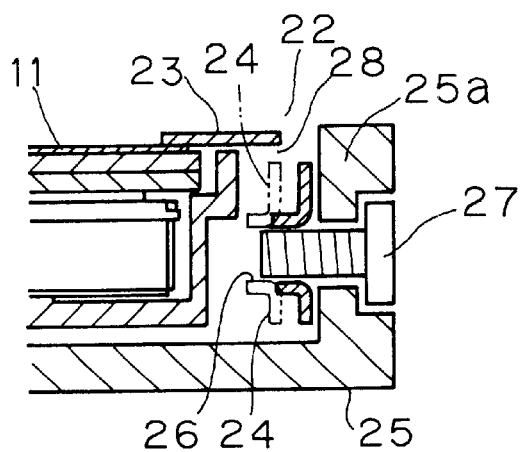
FIG. 3 is a cross sectional view showing the portion in FIG. 2 as it is attached to a housing.
Figure 4:
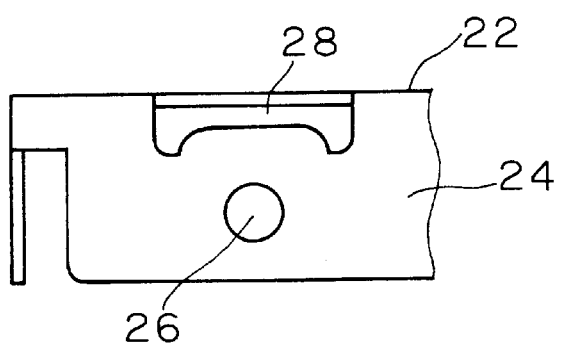
FIG. 4 is a partial view of a slit as it is formed.

The bezel 22, as shown in FIG. 2, comprises a front-surface portion 23 and a side-surface portion 24 which approximately define the letter "L" in cross section. The front-surface portion 23 and the side-surface portion 24 cover the periphery of a front surface and side surfaces of the display cell 11, so that the display cell 11 is fixed to a housing 25 which is shown in FIG. 3 directly or indirectly.

Female screws 26 are formed in and integrated with the side-surface portion 24 of the bezel 22. As shown in FIG. 3, male screws 27 are screwed into the female screws 26, penetrating the side wall portion 25a of the housing 25.

A backlight 17 is attached to the back surface of the display cell 11, and fitted into the frame 18 of plastic or the like together with the display cell 11 as one.

With respect to the female screws 26, for the purpose of enabling deformation of the housing 25 toward an inner surface of the housing 25, slits 28 are formed in the side-surface portion 24 in the vicinity of the female screws 26 and the areas with the slits 28 are accordingly deformable, as shown in FIGS. 1C, 2, 3 and 4.

In FIG. 1A, one side of the bezel 22 on the left-hand side is a reference side 22a. Since the position of the reference side 22a is fixed, as shown in FIG. 1B, a slit 28 is not formed on the reference side 22a.

During assembly, the display cell 11 mounting the bezel 22 is, as shown in FIG. 3, housed in the housing 25 with a surface of the display cell 11 which serves as a display surface open. Following this, the male screws 27 penetrating the side wall portion 25a of the housing 25 are engaged with the female screws 26 which are formed in the side-surface portion 24 of the bezel 22, thereby fixedly fastening these elements as one unit.

If there is a gap between the side-surface portion 24 of the bezel 22 and the inner surface of the housing 25 due to a dimensional tolerance or the like, the fastening force of the male screws 27 pulls the side-surface portion 24 of the bezel 22 toward the side wall portion 25a of the housing 25.

To deal with this, slits 28 are formed in the vicinity of the female screws 26 which are formed as integrated portions in the side-surface portion 24 of the bezel 22. Since the areas where the slits 28 are formed are deformable, only the areas with the slits 28 in the side-surface portion 24 get deformed and pulled toward the side wall portion 25a of the housing 25 as shown in FIG. 3.

In short, the other portions including the front-surface portion 23 remain as they originally are, which obviates large bending of one side of the bezel as shown in FIG. 16. This prevents an inconvenience in that a display window of the housing and the display screen of the display cell 11 are not positionally aligned to each other because of bending of a display window of the bezel.

Figure 5:
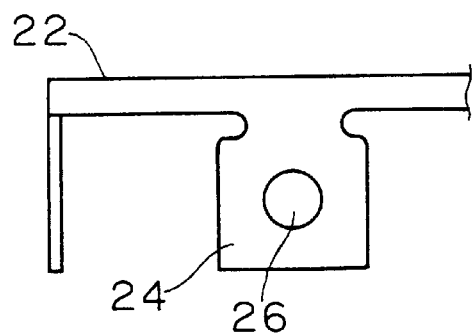
FIG. 5 is a partial view showing the second preferred embodiment in which a female screw is tongue-like shaped with flexibility.
Figure 6:
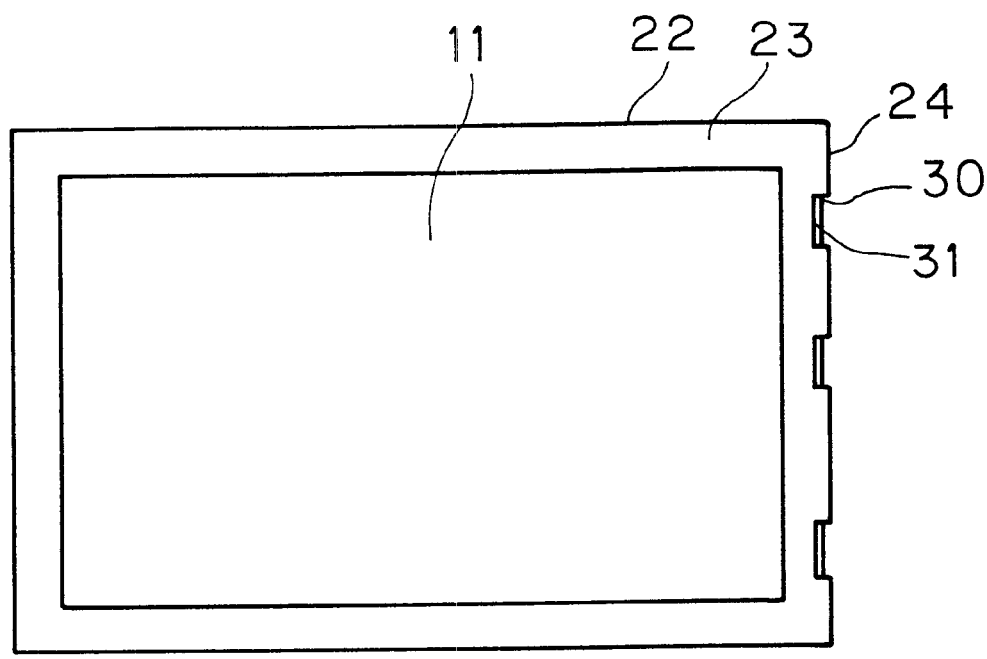
FIG. 6 is a plan view showing the third preferred embodiment.
Figure 7:
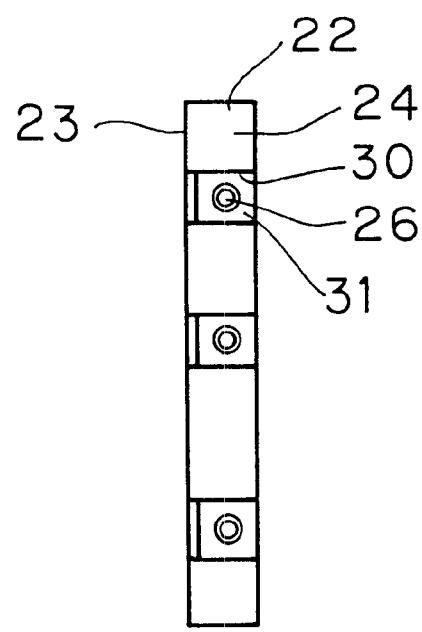
FIG. 7 is a right-hand side view of FIG. 6.

The second preferred embodiment of the present invention will be described with reference to FIG. 5.

The side-surface portion 24 of the bezel 22, in which the female screws 26 are formed as integrated portions, is shaped as a tongue-like portion, so that the tongue-like portion is flexible.

Even in this structure as well, only the female screws 26 bend, on the other hand the other portions including the front-surface portion 23 remain as they are originally are.

Hence, it is possible to prevent an inconvenience in that the display window of the housing 25 and the display screen of the display cell 11 are not positionally aligned with each other.

In the first and the second preferred embodiments, a downward force may sometimes act upon an inner side of the front-surface portion 23 of the bezel 22 during deformation of the female screws 26. To deal with this, an angle between the front-surface portion 23 and the side-surface portion 24 of the bezel 22, which approximately define the letter "L" in cross section, may be set slightly larger than 90 degrees, so that the downward force is reduced. This prevents application of a large load upon the surface portion of the display cell 11, and hence, disconnection of a tab due to vibration or twisting during use of the flat-panel display device.

The third preferred embodiment of the present invention will be described with reference to FIGS. 6 through 13.

According to the third preferred embodiment, the frame 18 which integrates the display cell 11 and the backlight 17 with each other comprises a frame side portion 32.

The bezel 22, which is formed by a metallic material into the shape of a picture frame, is attached to the display cell 11. The bezel 22 comprises the front-surface portion 23 and the side-surface portion 24 which approximately define the letter "L" in cross section. The front-surface portion 23 and the side-surface portion 24 cover the periphery of a front surface and side surfaces of the display cell 11.

However, unlike in the preferred embodiments described above, the female screws 26 are not formed as integrated portions in the side-surface portion 24 of the bezel 22, but are formed as separate elements.

More specifically, formed in the side-surface portion 24 of the bezel 22 where the female screws 26 are arranged are notched openings 30. Metallic bar rings 31 which comprise the female screws 26 are, as shown in FIGS. 9 and 10, held by and integrated with thin portions which are formed to have flexibility in the frame side portion 32 which is made of plastic or the like, inside the side-surface portion 24 of the bezel 22.

As shown in these drawings, denoted at 33 is an attaching member which is disposed to a sidewall (not shown) of a housing.

During assembly, the display cell 11 mounting the bezel 22 is housed in the housing (not shown) with a surface of the display cell 11 which serves as a display surface open. Following this, the male screws 27 are engaged with the female screws 26 which are formed in the metallic bar rings 31, penetrating the attaching member 33 which is disposed to the side wall of the housing and through the openings 30 which are formed in the side-surface portion 24 of the bezel 22 in which the male screws 27 are formed, whereby these elements are fixedly fastened as one unit.

Figure 8:
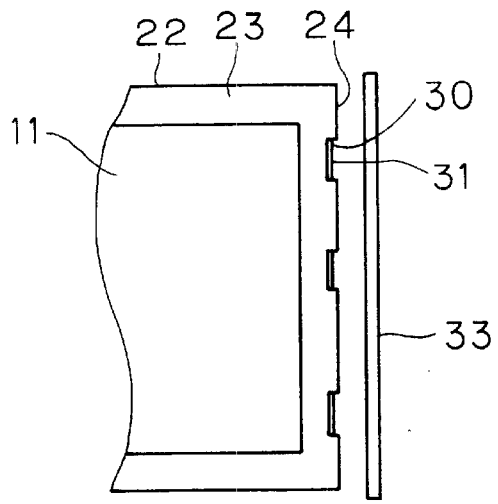
FIG. 8 is a plan view showing a relationship with a housing side which is shown in FIG. 6.
Figure 9:
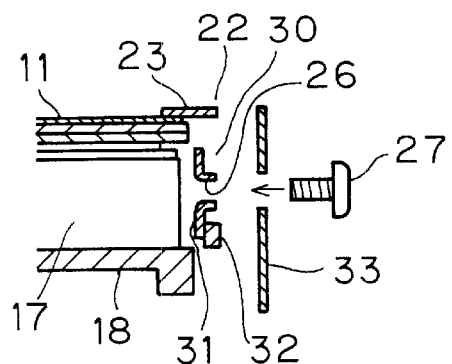
FIG. 9 is a front cross sectional view of FIG. 8.
Figure 10:
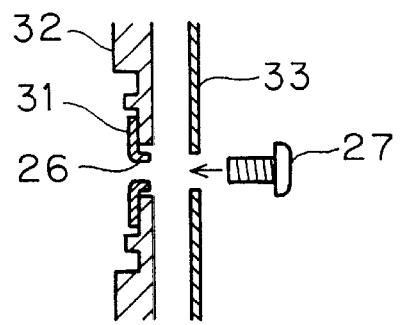
FIG. 10 is a plan cross sectional view which corresponds to the portion which is shown in FIG. 9.

If there is a gap between the side-surface portion 24 of the bezel 22 and the attaching member 33 which is disposed to the side wall of the housing due to a dimensional tolerance or the like as shown in FIGS. 8 through 10, the metallic bar rings 31 which comprise the female screws 26 are pulled by a fastening force of the male screws 27 toward the attaching member 33 which is disposed to the side wall of the housing. The openings 30 are formed in the side-surface portion 24 of the bezel 22, and the frame side portion 32 flexibly holds the metallic bar rings 31 which are formed separately and comprise the female screws 26, so that these portions are deformable.

Figure 11:
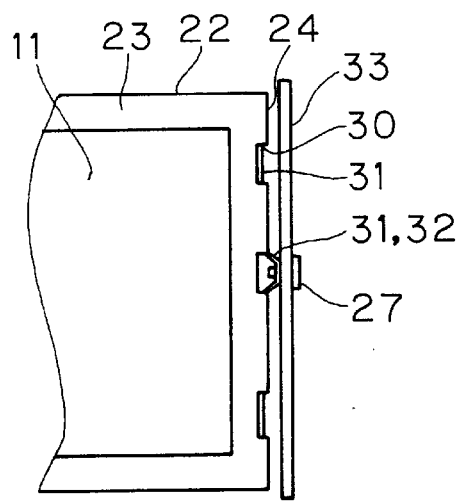
FIG. 11 is a plan view of the portion which is shown in FIG. 8 as it is fastened with a male screw.
Figure 12:
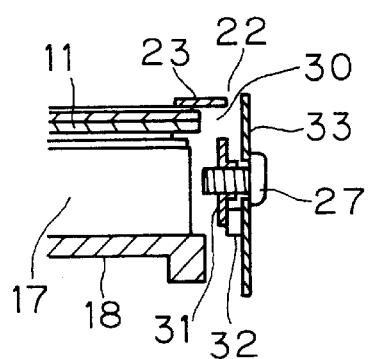
FIG. 12 is a front cross sectional view of the portion which is shown in FIG. 9 as it is fastened with the male screw.
Figure 13:
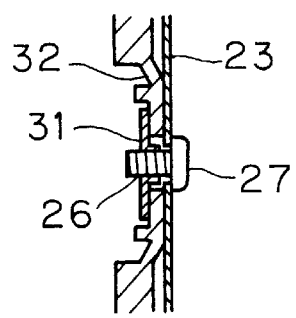
FIG. 13 is a front cross sectional view of the portion which is shown in FIG. 10 as it is fastened with the male screw.

Hence, as shown in FIGS. 11 through 13, only the flexible portions of the frame side portion 32 holding the separate metallic bar rings 31 are deformed because of a pulling force and are pulled through the openings 30 which are formed in the side-surface portion 24 toward the attaching member 33 which is disposed to the side wall of the housing. That is, the other portions including the front-surface portion 23 of the bezel 22 remain as they originally are, which obviates large bending of one side of the bezel as shown in FIG. 16. This prevents an inconvenience in that a display window of the housing and the display screen of the display cell 11 are not positionally aligned with each other because of bending of the display window of the bezel.

Figure 14:
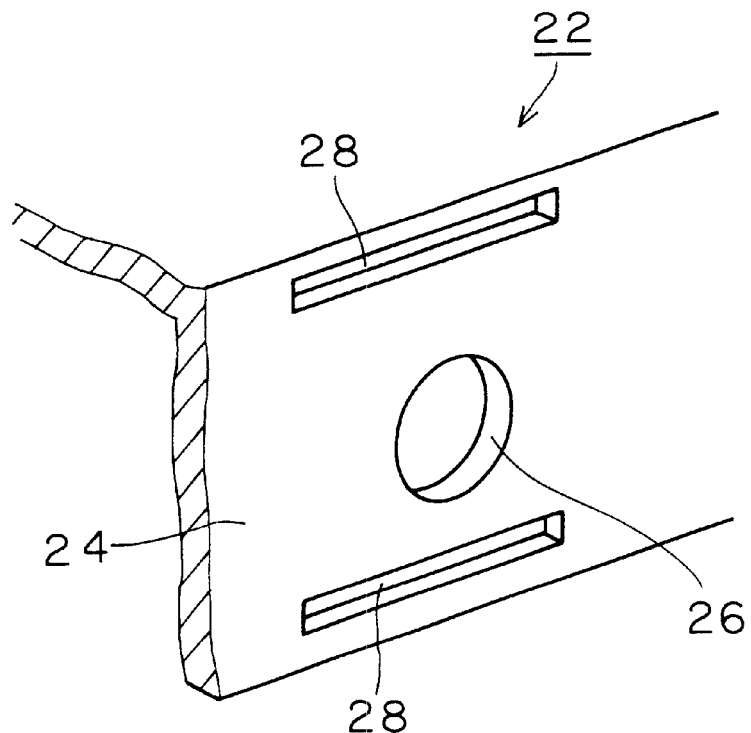
FIG. 14 is an explanatory diagram showing the fourth preferred embodiment.

The fourth preferred embodiment will be described with reference to FIG. 14.

The fourth preferred embodiment is a modification of the first preferred embodiment. According to the fourth preferred embodiment, the female screws 26 are formed in the side-surface portion 24 of the bezel 22, and slits 28, 28 are formed above and below the female screws 26.

In the fourth preferred embodiment as well, since a portion between the slits 28, 28 is flexible, this portion is pulled toward the side wall portion 25a of the housing 25. In other words, the other portions including the front-surface portion 23 remain as they originally are, thereby preventing one side of the bezel from major bending. Hence, it is possible to prevent an inconvenience in that a display window of the housing and the display screen of the display cell 11 are not positionally aligned with each other because of bending of the display window of the bezel.

Figure 15:
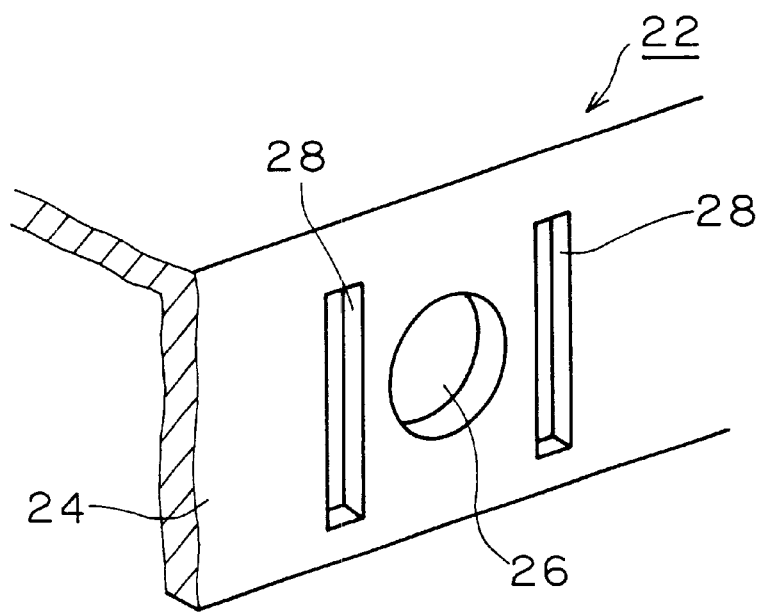
FIG. 15 is an explanatory diagram showing the fifth preferred embodiment.

The fifth preferred embodiment will be described with reference to FIG. 15.

The fifth preferred embodiment is a modification of the first preferred embodiment. According to the fifth preferred embodiment, the female screws 26 are formed in the side-surface portion 24 of the bezel 22, and slits 28, 28 are formed on the right-hand side and the left-hand side of the female screws 26.

In the fifth preferred embodiment as well, since a portion between the slits 28, 28 is flexible, this portion is pulled toward the side wall portion 25a of the housing 25. In other words, the other portions including the front-surface portion 23 remain as they originally are, thereby preventing one side of the bezel from major bending. Hence, it is possible to prevent an inconvenience in that a display window of the housing and the display screen of the display cell 11 are not positionally aligned with each other because of bending of a display window of the bezel.

What is claimed is:

1. A flat-panel display device comprising:
   a flat display cell having a display screen on a front surface;
   a bezel for fixing which includes a picture-frame shaped front-surface portion defining an opening, and a bezel's side-surface portion disposed to be extended from outermost sides of said front-surface portion, said bezel covering periphery of said front surface and side surfaces of said display cell;
   a housing accommodating said display cell covered with the bezel and leaving said front surface of the display cell as opened;
   a deformable portion formed on said bezel's side-surface portion so as to be deformed in accordance with proceeding of screwing;
   a female screw formed in the deformable portion; and
   a screw fastening said housing to said bezel's side-surface portion having the female screw.

2. The flat-panel display device of claim 1, wherein a slit is disposed on said bezel's side-surface portion so as to form the deformable portion.

3. The flat-panel display device of claim 1, wherein a slit is disposed above said female screw on said bezel's side-surface portion so as to form the deformable portion.

4. The flat-panel display device of claim 1, wherein slits are formed above and below said female screw on said bezel's side-surface portion so as to form the deformable portion.

5. The flat-panel display device of claim 1, wherein slits are formed on the right-hand side and the left-hand side of said female screw on said bezel's side-surface portion so as to form the deformable portion.

6. The flat-panel display device of claims 1 through 5, wherein an angle between said front-surface portion of the bezel and said bezel's side-surface portion is larger than 90 degrees.

7. A flat-panel display device, comprising:

a flat display cell having a display screen on a front surface;

a backlight arranged on a back surface of said display cell;

a flexible frame holding said display cell and said backlight as one unit;

a bezel for fixing comprised of a picture-frame shaped front-surface portion defining an opening, and a bezel's side-surface portion disposed to be extended from outermost sides of said front-surface portion, said bezel covering periphery of said front surface of the display cell and a frame's side-surface portion of said flexible frame;

a housing accommodating said display cell covered with the bezel and leaving said front surface of the display cell as opened;

an opening formed on the bezel's side-surface portion;

a deformable portion formed on said frame's side-surface portion so as to be deformed in accordance with proceeding of screwing;

a female screw formed in said deformable portion; and a screw being inserted through said housing and into said opening on the bezel's side-surface portion to engage with said female screw.

8. The flat-panel display device of claim 7, wherein said frame's side-surface portion has a thin walled portion so as to form the deformable portion.

* * * * *